United States Patent
Vanini et al.

(10) Patent No.: US 9,742,683 B1
(45) Date of Patent: Aug. 22, 2017

(54) TECHNIQUES FOR ENABLING PACKET PRIORITIZATION WITHOUT STARVATION IN COMMUNICATIONS NETWORKS

(71) Applicant: CISCO TECHNOLOGY, INC., San Jose, CA (US)

(72) Inventors: Erico Vanini, Balerna (CH); Rong Pan, Saratoga, CA (US); Thomas J. Edsall, Los Gatos, CA (US)

(73) Assignee: Cisco Technology, Inc., San Jose, CA (US)

(*) Notice: Subject to any disclaimer, the term of this patent is extended or adjusted under 35 U.S.C. 154(b) by 105 days.

(21) Appl. No.: 14/931,588

(22) Filed: Nov. 3, 2015

(51) Int. Cl.
*H04L 12/863* (2013.01)
*H04L 12/875* (2013.01)
*H04L 12/865* (2013.01)

(52) U.S. Cl.
CPC ...... *H04L 47/6275* (2013.01); *H04L 47/6215* (2013.01); *H04L 47/6255* (2013.01)

(58) Field of Classification Search
CPC ............. H04L 47/6275; H04L 47/6255; H04L 47/6215
See application file for complete search history.

(56) References Cited

U.S. PATENT DOCUMENTS

| | | | | |
|---|---|---|---|---|
| 7,281,086 | B1* | 10/2007 | More | G06F 3/061 710/39 |
| 7,574,538 | B1* | 8/2009 | Yochai | G06F 3/0613 710/36 |
| 7,715,419 | B2 | 5/2010 | Tatar et al. | |
| 7,729,351 | B2 | 6/2010 | Tatar et al. | |
| 7,792,027 | B2 | 9/2010 | Tatar et al. | |
| 7,809,009 | B2 | 10/2010 | Tatar et al. | |
| 7,864,791 | B2 | 1/2011 | Tatar et al. | |
| 8,571,024 | B2 | 10/2013 | Tatar et al. | |
| 2006/0050690 | A1* | 3/2006 | Epps | H04L 12/5693 370/359 |
| 2007/0121499 | A1* | 5/2007 | Pal | H04L 45/60 370/230 |
| 2007/0156955 | A1* | 7/2007 | Royer, Jr. | G06F 13/387 711/113 |
| 2013/0262648 | A1* | 10/2013 | Orlik | H04L 47/32 709/223 |
| 2015/0271089 | A1* | 9/2015 | Tang | H04L 47/522 370/229 |

* cited by examiner

*Primary Examiner* — Brian D Nguyen

(57) ABSTRACT

A method is provided in one example embodiment and includes determining whether a packet received at a network node in a communications network is a high priority packet; determining whether a low priority queue of the network node has been deemed to be starving; if the packet is a high priority packet and the low priority queue has not been deemed to be starving, adding the packet to a high priority queue, wherein the high priority queue has strict priority over the low priority queue; and if the packet is a high priority packet and the low priority queue has been deemed to be starving, adding the packet to the low priority queue.

20 Claims, 4 Drawing Sheets

TECHNIQUES FOR ENABLING PACKET PRIORITIZATION WITHOUT STARVATION IN COMMUNICATIONS NETWORKS

TECHNICAL FIELD

This disclosure relates in general to the field of communications networks and, more particularly, to techniques for enabling packet prioritization without starvation in such networks.

BACKGROUND

It is known that data center traffic, like Internet traffic, is extremely "heavy-tailed," meaning that a small number of flows (referred to herein as "elephant flows") carry the majority of traffic and the remaining large number of flows (referred to herein as "mice flows") carry very little traffic. Given these characteristics, the effect of packet drops for the two types of flows (elephant vs. mice) is vastly different. In particular, while packet drops are used to regulate the rate of elephant flows, packet drops for mice flows, such as incast flows, could be highly detrimental, as any drop of incast packets could severely negatively impact the completion time of the corresponding flow.

Packet prioritization techniques have been used to help mice flows avoid packet drops and help them finished faster while providing enough drops for elephant flows to regulate their rates. One such packet prioritization technique places the first "n" packets of a flow into a high priority queue, which is a strict priority queue that is always serviced first. When a flow has more than n packets, the remaining packets (i.e., those not placed in the strict priority queue) are placed into a low priority queue that is only serviced when the strict priority queue is empty. Note that there is no packet reordering issue with this approach, as the strict priority queue is always serviced first. One weakness of this technique is that if n becomes large, the low priority queue could be starved out. To avoid starvation, a conservative (i.e., low) value of n is typically chosen. However, if n is too small, mice flows cannot be fully sped up.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes determining whether a packet received at a network node in a communications network is a high priority packet; determining whether a low priority queue of the network node has been deemed to be starving; if the packet is a high priority packet and the low priority queue has not been deemed to be starving, adding the packet to a high priority queue, wherein the high priority queue has strict priority over the low priority queue; and if the packet is a high priority packet and the low priority queue has been deemed to be starving, adding the packet to the low priority queue. In particular embodiments, the method further includes determining whether the high priority queue is empty; and if the high priority queue is not empty, dequeuing a packet form the high priority queue. The method may still further include, if the high priority queue is empty, determining whether the low priority queue is empty; and if the low priority queue is not empty, dequeuing a packet form the low priority queue.

In some embodiments, the determining whether the low priority queue has been deemed to be starving includes determining whether a first time period has elapsed since a dequeue from the low priority queue last occurred. The determining whether the low priority queue has been deemed to be starving may further include, subsequent to determining that the first time period has elapsed, determining whether the low priority queue is empty, wherein if the low priority queue is empty, the low priority queue is no longer deemed to be starving. Moreover, the determining whether the low priority queue is starving further may also include, subsequent to determining that the first time period has elapsed, determining whether a second time period has elapsed since the low priority queue was initially determined to be starving, wherein if the second time period has not elapsed, the low priority queue is deemed to be starving.

The determining whether the low priority queue is starving may further include, subsequent to determining that the first time period has elapsed, determining whether a theoretical bandwidth of the high priority queue is less than a predetermined value, wherein if the theoretical bandwidth of the high priority queue is not less than the predetermined value, the low priority queue is deemed to be starving.

Example Embodiments

Figure 1:
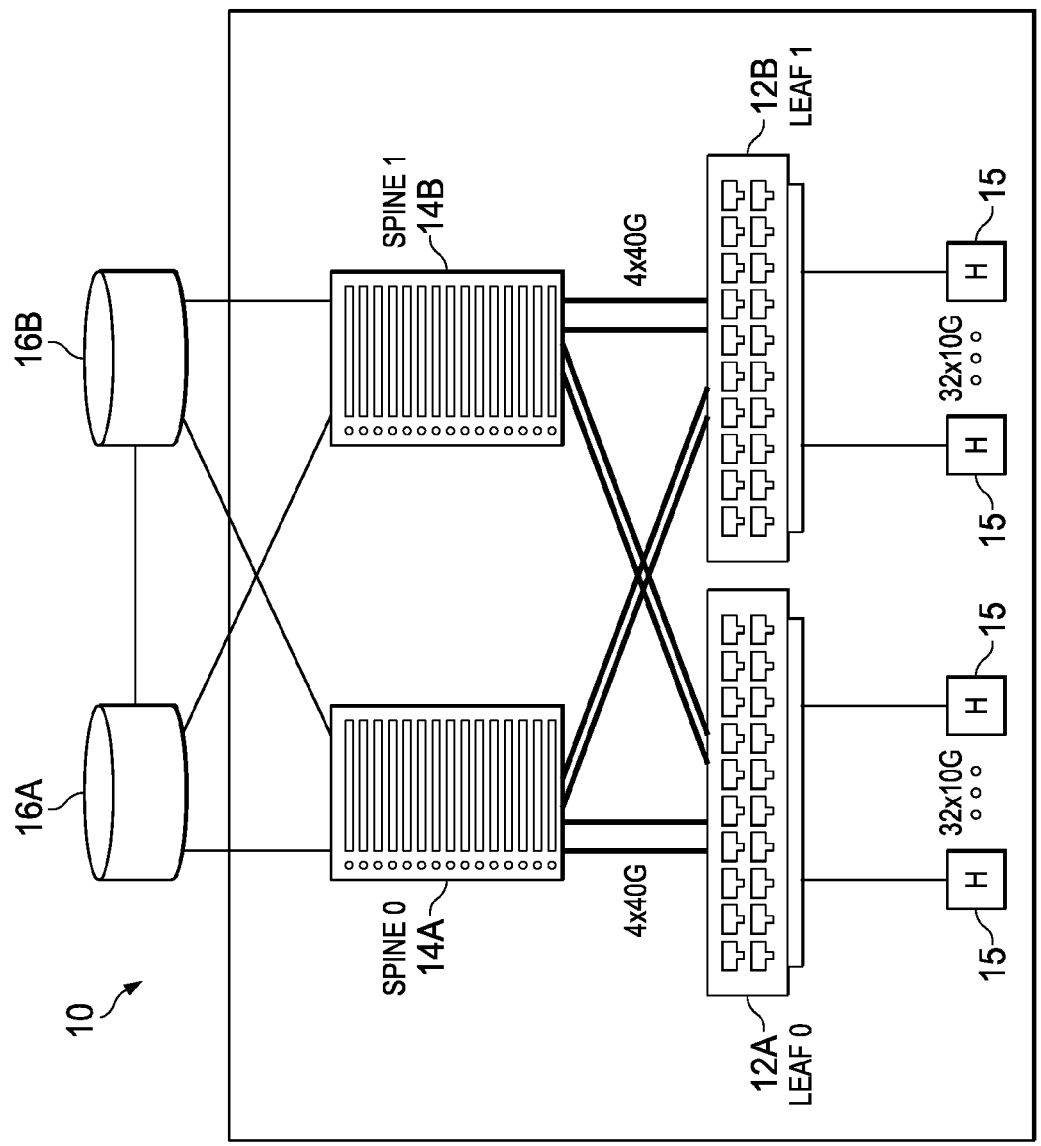
FIG. 1 is a simplified block diagram of a network communications environment in which techniques for enabling packet prioritization without low priority starvation in networks such as data center networks in accordance with embodiments described herein.

Referring now to FIG. 1, illustrated therein is a block diagram of a data center network 10 in which a technique for enabling packet prioritization without starvation may be implemented in accordance with features described herein. According to an embodiment, the network 10 is a data center network configured in accordance with a spine-leaf topology. In a spine-leaf architecture, a series of leaf nodes, designated in FIG. 1 by reference numerals 12A and 12B, for the access layer. The leaf nodes 12A, 12B, are fully meshed to a series of spine nodes, designated in FIG. 1 by reference numerals 14A and 14B. The mesh interconnection ensures that access layer switches 12A, 12B, are no more than a single hope away from one another. This minimizes latency, as well as the likelihood of bottlenecks between access layer switches. This spine-leaf topology is generally referred to as an Ethernet fabric.

Spine-leaf architectures can be layer 2 ("L2") or layer 3 ("L3"), such that the links between the leaf and spine nodes may be either switched or routed. In either case, all of the links are forwarding links; that is, none of the links are blocked. In an L2 spine-leaf architecture, spanning tree may be replaced with either a version of Transparent Interconnection of Lots of Links ("TRILL") or shortest path bridging ("SPB"). Both Trill and SPB learn where hosts, such as hosts 15, are connected to the fabric and provide a loop-free path to their Ethernet MAC addresses via a Shortest Path First ("SPF") computation. One example of a proprietary implementation of TRILL that could be used to build an L2 spine-leaf topology is FabricPath available from Cisco Systems, Inc., of San Jose, Calif. In an L3 spine-leaf architecture, each link is a routed link. Open Shortest Path First ("OSPF") may be used as the routing protocol to compute paths between leaf and spine nodes. An L3 leaf-spine architecture works effectively when network virtual local area networks ("VLANs") are isolated to individual leaf nodes or when network overlays, such as VXLAN, which are common in highly virtualized, multi-tenant environments, are employed.

A core tier, represented in FIG. 1 by core nodes 16A, 16B, provides high-speed packet switching backplane for all flows going into and out of the data center. The core provides connectivity to multiple aggregation modules and provides a resilient L3 routed fabric with no single point of failure. The core runs an interior routing protocol, such as OSPF or Border Gateway Protocol ("BGP"), and load-balances traffic between all attached segments within the data center.

In one embodiment, the leaf nodes 12A, 12B, spine nodes 14A, 14B, and core nodes 16A, 16B, may be implemented using Nexus 9K series switches, available from Cisco Systems, Inc., of San Jose Calif.

Each of the nodes 12A, 12B, 14A, 14B, include a packet prioritization feature that utilizes two queues, one of which is a high priority queue that is always processed first and the other of which is a low priority queue which is processed after the strict priority queue is empty. As previously noted, one packet prioritization technique places the first n packets of a flow into the strict priority queue and the remaining packets in the low priority queue. Even with careful selection of a value for n, it is possible that the low priority queue will be starved.

Therefore, an aim of embodiments described herein is to dynamically tune the value of n thereby to introduce flexibility when traffic distribution is highly variable. In other words, if there is not enough traffic in the high (or strict) priority queue, the value of n should be increased to allow more mice traffic into the high priority queue. In contrast, if there is too much traffic in the high priority queue, the value of the threshold n should be decreased to reduce the amount of mice traffic in the high priority queue and avoid starving out the low priority queue. As used herein, the words and/or phrases "starve," "starving" or "starvation of" are used to refer to a situation in which a queue (in particular, the low priority queue) is not being serviced (i.e., is being starved of service) such that packets are not being dequeued from the queue on a regular basis, if at all.

In accordance with features of embodiments described herein, and as described in greater detail below, two queues are established for each outgoing link and one of the queues is strictly prioritized over the other. The first n packets of each new flow are prioritized and placed in the high priority queue. The remaining packets beginning with the n+1th packet are placed in the low priority queue. As previously noted, it is well known that the strict priority queue could cause starvation issues for the low priority queue in situations in which there is always at least one packet in the strict priority queue. In these situations, the low priority queue will never be serviced and hence starved forever. In accordance with techniques described herein, a mechanism is provided to avoid starvation of the low priority queue. The mechanism generally works as follows. First, the elapsed time since the last dequeue operation from the low priority queue is monitored and if it is longer than a certain time period Tmax, enqueuing of packets in the high priority queue ceases. This cessation of high priority queuing, referred to as "priority OFF" mode, guarantees that the high priority queue will become empty in an amount of time that equals its queue length divided by the link rate. Once the high priority queue empties out, dequeuing of packets from the low priority queue may begin. When heavy traffic dissipates, the strict priority queue is not immediately turned back on due to potential reordering issues. When in priority OFF mode, the condition of the low priority queue is monitored and when the low priority queue becomes empty, the system may be returned to priority ON mode (in which high priority queueing will begin again). In this manner, no high priority marked packets are on the low priority queue (and therefore potentially starved) when priority is turned on again. As a result, packets marked as high priority can be enqueued in the high priority queue once again.

Figure 2:
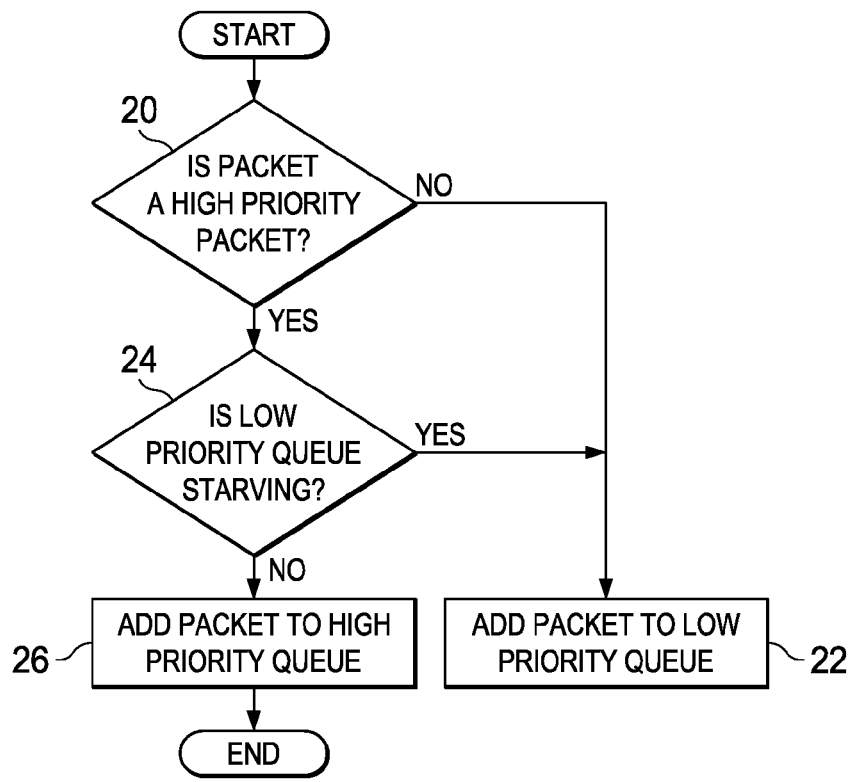
FIG. 2 is a flow diagram illustrating an enqueuing operation of a technique for enabling packet prioritization without low priority queue starvation in networks such as data center networks in accordance with embodiments described herein.

Referring now to FIG. 2, a flow chart is illustrated showing an enqueuing process performed at a node in accordance with features described herein. As shown in FIG. 2, in step 20, a determination is made whether a packet is to be placed in the high priority queue. This determination may be made by determining whether n packets of the flow have already been enqueued in the high priority queue. If it is determined that the packet is not to be placed in the high priority queue, execution proceeds to step 22, in which the packet is added to the low priority queue. Returning to step 20, if it is determined that the packet is a high priority packet, execution proceeds to step 24, in which a determination is made whether the low priority queue is starving. This step may be performed as described below with reference to FIGS. 4 and 5. If it is determined in step 24 that the low priority queue is not starving, execution proceeds to step 26, in which the packet is added to the high priority queue. If it is determined in step 24 that the low priority queue is not being starved, execution proceeds to step 22, in which the packet is added to the low priority queue.

Figure 3:
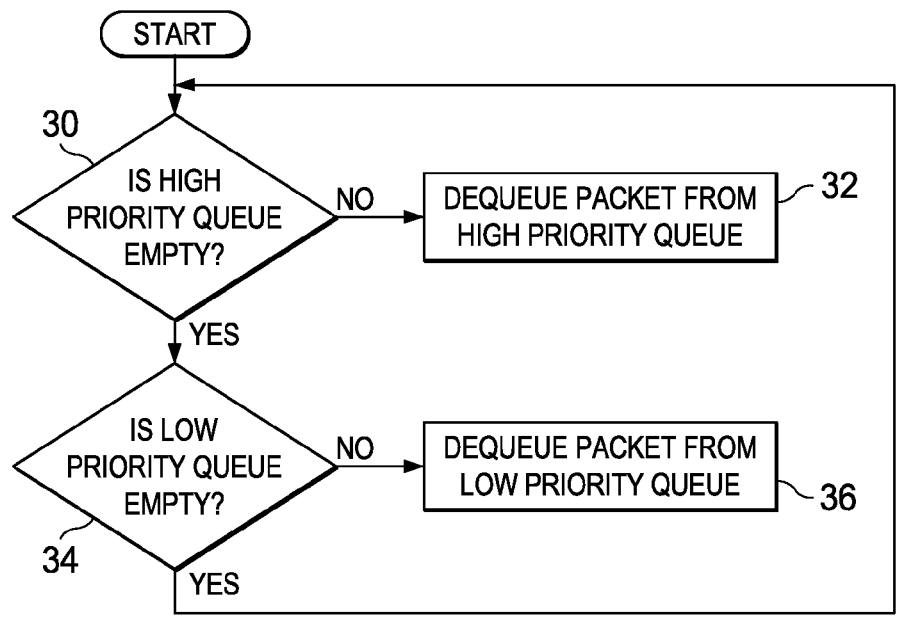
FIG. 3 is a flow diagram illustrating a dequeuing operation of a technique for enabling packet prioritization without low priority queue starvation in networks such as data center networks in accordance with embodiments described herein.

FIG. 3 illustrates a flowchart showing a dequeuing process performed at a node in accordance with features described herein. In step 30, a determination is made whether the high priority queue is empty. If not, execution proceeds to step 32, in which a packet is dequeued from the high priority queue. If it is determined in step 30 that the high priority queue is not empty, execution proceeds to step 34, in which a packet is dequeued from the low priority queue.

Figure 4:
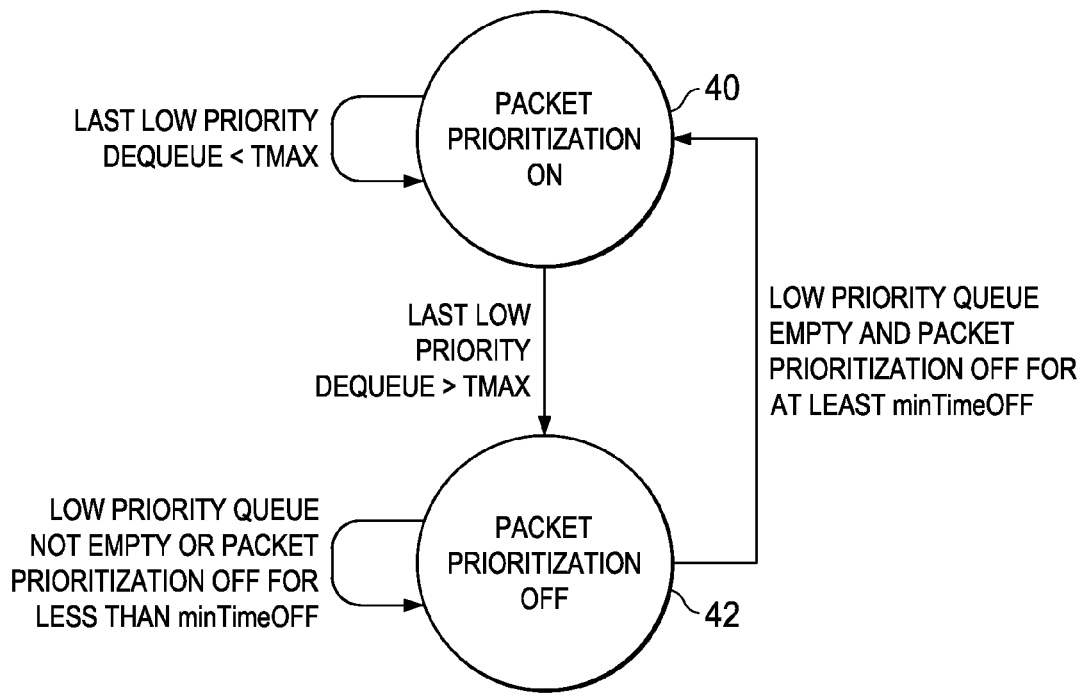
FIG. 4 is a state diagram illustrating a technique for determining whether the low priority queue is starving in accordance with embodiments described.

FIG. 4 is a state diagram illustrating a technique for determining whether the low priority queue is starving in step 24 (FIG. 2). Referring to FIG. 4, the technique has two states, including priority ON 40, and priority OFF 42. Tmax is the maximum wait time allowed between dequeuing of packets from the low priority queue. minTimeOFF is the minimum time that system must remain in the priority OFF state before it can transition back to the priority ON state. Assuming the system begins in the priority ON state 40, the system remains in the priority ON state so long as the last packet dequeue from the low priority queue occurred less than or equal to a time Tmax ago (i.e., so long as packets are being dequeued from the low priority queue on a regular basis). If the last packet dequeue from the low priority queue occurred greater than a time Tmax ago (meaning that the low priority queue is potentially being starved because packets are not being emptied therefrom in a timely manner), the system transitions to the priority OFF state 42. From the prioritization OFF state 42, if the low priority queue is not empty or the system has been in the priority OFF state 42 for less than or equal to minTimeOFF (which is the minimum time that the system must remain in the priority OFF state 42 before returning to the priority ON state 40), the system remains in the priority OFF state 42. The minTimeOFF restriction adds hysteresis and prevents spikes on the system that may be caused by too frequent transitions between states. If the system is in the priority OFF state 42 and the low priority queue is empty and the system has been in the priority OFF state 42 for a time equal to or greater than a time minTimeOFF, the system transitions back to the priority ON state 40. The priority ON state 40 corresponds to a state in which the low priority queue is not being starved (in which case the determination made in step 24 illustrated in FIG. 2 would be NO). The priority OFF state 42 corresponds to a state in which the low priority queue is being starved (in which case the determination made in step 24 illustrated in FIG. 2 would be YES).

In certain embodiments, the throughput of the high priority queue is monitored and a limit is set on it. For example, in addition to the technique described with reference to FIG. 4, the average utilization of traffic that is able to get through on the high priority queue is checked and a determination is made whether it is lower than U %, wherein in certain embodiments, U may be equal to 25. If the utilization of the high priority queue is greater than U %, packet prioritization is turned off to avoid starvation. Only when the utilization falls to an acceptable level will the packet prioritization be turned back on. This additional check introduces an additional starvation detection mechanism in order to enhance performance of the system.

In certain embodiments, the value of n may be chosen based on a known distribution (such as in distributed storage). In other embodiments, the value of n may be selected dynamically based on link utilization (U %) to make sure that at most U % of the traffic goes to the high priority queue.

Figure 5:
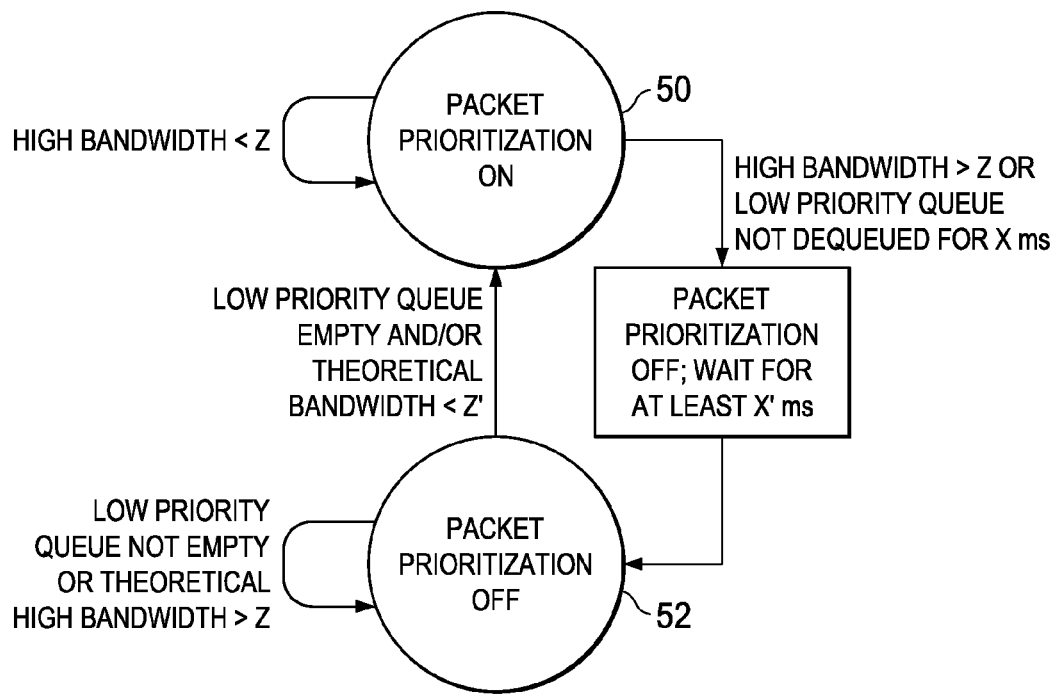
FIG. 5 is a state diagram illustrating an enhanced technique for determining whether the low priority queue is starving in accordance with embodiments described herein.

FIG. 5 is a state diagram illustrating an enhanced technique for determining whether the low priority queue is starving in step 24 (FIG. 2) in which high priority queue throughput is considered. Referring to FIG. 5, the technique has two states, including priority ON 50, and priority OFF 52. Again, Tmax is the maximum wait time allowed between dequeuing of packets from the low priority queue and minTimeOFF is the minimum time that system must remain in the priority OFF state before it can transition back to the priority ON state. Referring to FIG. 5, assuming the system begins in the priority ON state 50, the system remains in the priority ON state so long as the bandwidth, or throughput, of the high priority queue is less than or equal to Z (e.g., 20%). Once the bandwidth, or throughput, of the high priority queue is greater than Z or the low priority queue has not been dequeued for X ms (e.g., 5 ms), packet prioritization is turned off and the system waits for at least X' ms (e.g., 10 ms). The system then enters the priority OFF state 52. The system remains in the priority OFF state 52 so long as the low priority queue is not empty or the theoretical bandwidth of the high priority queue is greater than Z. It will be noted that a theoretical bandwidth of the high priority queue is used in the priority OFF state 52 because the high priority queue has no actual throughput in this state. In certain embodiments, theoretical bandwidth is measured/estimated by counting the number of packets that would have been placed in the high priority queue if packet prioritization had remained on. This is used to determine the theoretical bandwidth of the high priority queue. Once the low priority queue is empty and/or the theoretical bandwidth of the high priority queue is less than or equal to Z' (e.g., 10%), the system returns to the priority ON state 50.

Figure 6:
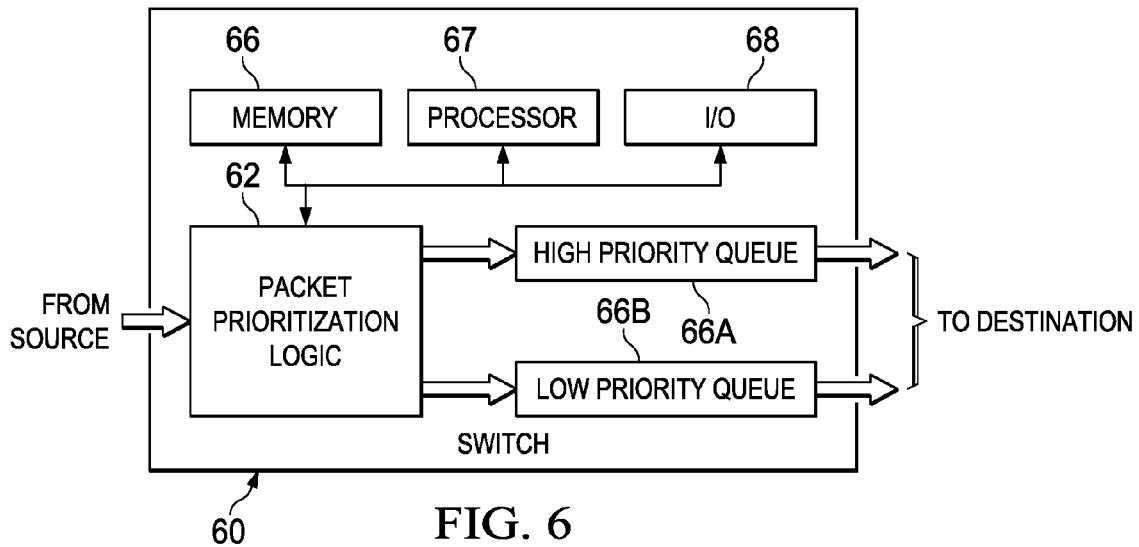
FIG. 6 is a simplified block diagram a network node configured for implementing a technique for enabling packet prioritization without low quality queue starvation in networks such as data networks in accordance with embodiments described herein.

In one example implementation, various network nodes, and particularly the spine and leaf nodes described herein, can include software for achieving the described functions. For example, FIG. 6 is a block diagram of one such network node 60 configured for implementing the embodiments described herein. As shown in FIG. 6, the node 60 includes packet prioritization module 62 comprising software embodied in one or more tangible media for facilitating the activities described herein. In particular, the packet prioritization module 62 comprises software for facilitating the processes illustrated in and described with reference to FIGS. 2-5 related to enqueuing and dequeuing packets to and from a high priority queue 64A and a low priority queue 64B. The node 60 may also include a memory device 66 for storing information to be used in achieving the functions as outlined herein. Additionally, the node 60 may include a processor 67 that is capable of executing software or an algorithm (such as embodied in module 60) to perform the functions as discussed in this Specification. Additionally, each of the packet prioritization node 60 may include various I/O devices, drivers, and interfaces, represented in FIG. 6 by I/O 68.

Figure 7:
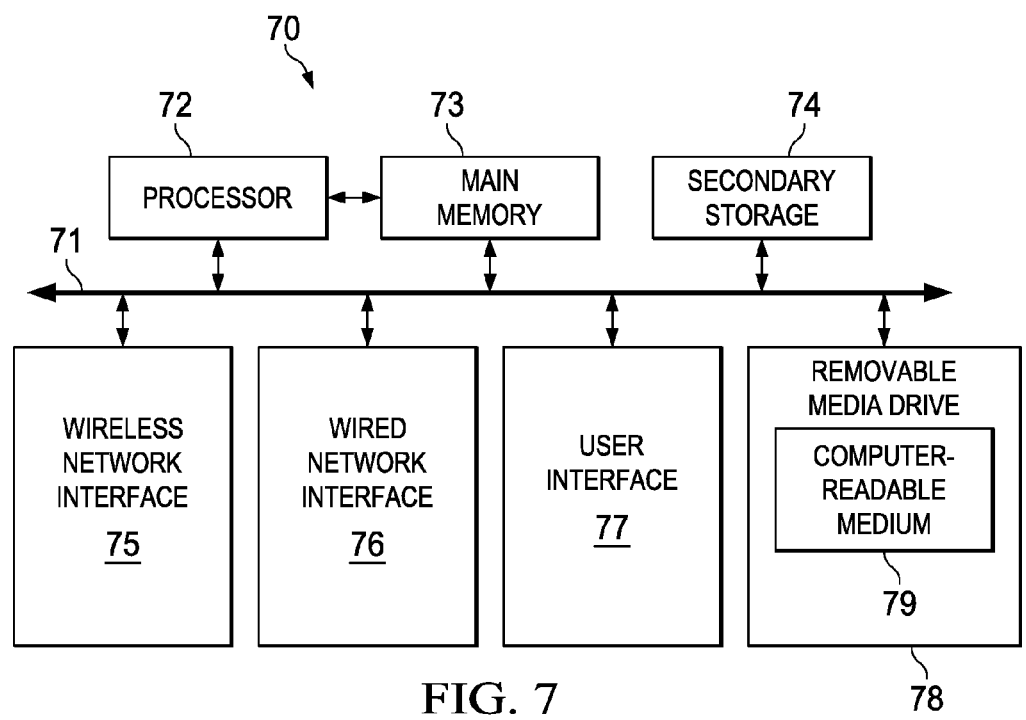
FIG. 7 is a simplified block diagram of a machine comprising an element of the network communications environment of FIG. 1 for implementing a technique for enabling packet prioritization without low priority queue starvation in accordance with embodiments described herein.

Although the examples are described with reference to a data center network, it will be recognized that the techniques are equally applicable to other network technologies. In one example implementation, various devices involved in implementing the embodiments described herein can include software for achieving the described functions. For example, as shown in FIG. 7, the nodes may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIGS. 3-6B. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIGS. 2-5 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 2-5. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Turning to FIG. 7, FIG. 7 illustrates a simplified block diagram of an example machine (or apparatus) 70, which in certain embodiments may comprise a switch, such as leaf node 12A, 12B, or spine node 14A, 14B, that may be implemented a system for implementing techniques for enabling packet prioritization without low priority queue starvation in accordance with features of embodiments described herein. The example machine 70 corresponds to network elements and computing devices that may be deployed in network 10, including, for example, leaf nodes 12A, 12B, and spine nodes 14, 14B. In particular, FIG. 7 illustrates a block diagram representation of an example form of a machine within which software and hardware cause machine 70 to perform any one or more of the activities or operations discussed herein. As shown in FIG. 7, machine 70 may include a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the memory, drives, interfaces, and other components of machine 70.

Processor 72, which may also be referred to as a central processing unit ("CPU"), can include any general or special-purpose processor capable of executing machine readable instructions and performing operations on data as instructed by the machine readable instructions. Main memory 73 may be directly accessible to processor 72 for accessing machine instructions and may be in the form of random access memory ("RAM") or any type of dynamic storage (e.g., dynamic random access memory ("DRAM")). Secondary storage 74 can be any non-volatile memory such as a hard disk, which is capable of storing electronic data including executable software files. Externally stored electronic data may be provided to computer 70 through one or more removable media drives 78, which may be configured to receive any type of external media such as compact discs ("CDs"), digital video discs ("DVDs"), flash drives, external hard drives, etc.

Wireless and wired network interfaces 75 and 76 can be provided to enable electronic communication between machine 70 and other machines, or nodes. In one example, wireless network interface 75 could include a wireless network controller ("WNIC") with suitable transmitting and receiving components, such as transceivers, for wirelessly communicating within a network. Wired network interface 76 can enable machine 70 to physically connect to a network by a wire line such as an Ethernet cable. Both wireless and wired network interfaces 75 and 76 may be configured to facilitate communications using suitable communication protocols such as, for example, Internet Protocol Suite ("TCP/IP"). Machine 70 is shown with both wireless and wired network interfaces 75 and 76 for illustrative purposes only. While one or more wireless and hardwire interfaces may be provided in machine 70, or externally connected to machine 70, only one connection option is needed to enable connection of machine 70 to a network.

A user interface 77 may be provided in some machines to allow a user to interact with the machine 70. User interface 77 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 78 represents a drive configured to receive any type of external computer-readable media (e.g., computer-readable medium 79). Instructions embodying the activities or functions described herein may be stored on one or more external computer-readable media. Additionally, such instructions may also, or alternatively, reside at least partially within a memory element (e.g., in main memory 73 or cache memory of processor 72) of machine 70 during execution, or within a non-volatile memory element (e.g., secondary storage 74) of machine 70. Accordingly, other memory elements of machine 70 also constitute computer-readable media. Thus, "computer-readable medium" is meant to include any medium that is capable of storing instructions for execution by machine 70 that cause the machine to perform any one or more of the activities disclosed herein.

Not shown in FIG. 7 is additional hardware that may be suitably coupled to processor 72 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 70 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 70 to appropriately manage the operation of the hardware components therein.

The elements, shown and/or described with reference to machine 70, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein related to techniques for enabling packet prioritization without starvation in data center networks may be implemented in software in, for example, leaf nodes 12A, 12B, and spine nodes 14A, 14B. In some embodiments, this software could be received or downloaded from a web server, provided on computer-readable media, or configured by a manufacturer of a particular element in order to provide this system for implementing autonomic LISP for enabling a secure hybrid cloud extension in accordance with features of embodiments described herein. In some embodiments, one or more of these features may be implemented in hardware, provided external to these elements, or consolidated in any appropriate manner to achieve the intended functionality.

In one example implementation, leaf nodes 12A, 12B, and spine nodes 14A, 14B, are network elements or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system for enabling techniques for enabling packet prioritization without starvation in data center networks described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 73, secondary storage 74, computer-readable medium 79) can store data used for the automatic configuration and registration operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 72) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of the network 10 may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   determining whether a packet received at a network node in a communications network is a high priority packet;
   determining whether a low priority queue of the network node has been deemed to be starving;
   if the packet is a high priority packet and the low priority queue has not been deemed to be starving, adding the packet to a high priority queue, wherein the high priority queue has strict priority over the low priority queue; and
   if the packet is a high priority packet and the low priority queue has been deemed to be starving, adding the packet to the low priority queue.

2. The method of claim 1 further comprising:
   determining whether the high priority queue is empty; and
   if the high priority queue is not empty, dequeuing a packet from the high priority queue.

3. The method of claim 2 further comprising:
   if the high priority queue is empty, determining whether the low priority queue is empty; and
   if the low priority queue is not empty, dequeuing a packet from the low priority queue.

4. The method of claim 1, wherein the determining whether the low priority queue has been deemed to be starving comprises determining whether a first time period has elapsed since a dequeue from the low priority queue last occurred.

5. The method of claim 4, wherein the determining whether the low priority queue has been deemed to be starving further comprises, subsequent to determining that the first time period has elapsed, determining whether the low priority queue is empty, wherein if the low priority queue is empty, the low priority queue is no longer deemed to be starving.

6. The method of claim 5, wherein the determining whether the low priority queue is starving further comprises, subsequent to determining that the first time period has elapsed, determining whether a second time period has elapsed since the low priority queue was initially determined to be starving, wherein if the second time period has not elapsed, the low priority queue is deemed to be starving.

7. The method of claim 5, wherein the determining whether the low priority queue is starving further comprises, subsequent to determining that the first time period has elapsed, determining whether a theoretical bandwidth of the high priority queue is less than a predetermined value, wherein if the theoretical bandwidth of the high priority queue is not less than the predetermined value, the low priority queue is deemed to be starving.

8. One or more non-transitory tangible media that includes code for execution and when executed by a processor is operable to perform operations comprising:
   determining whether a packet received at a network node in a communications network is a high priority packet;
   determining whether a low priority queue of the network node has been deemed to be starving;
   if the packet is a high priority packet and the low priority queue has not been deemed to be starving, adding the packet to a high priority queue, wherein the high priority queue has strict priority over the low priority queue; and
   if the packet is a high priority packet and the low priority queue has been deemed to be starving, adding the packet to the low priority queue.

9. The media of claim 8, wherein the operations further comprise:
   determining whether the high priority queue is empty; and
   if the high priority queue is not empty, dequeuing a packet from the high priority queue.

10. The media of claim 9, wherein the operations further comprise:
    if the high priority queue is empty, determining whether the low priority queue is empty; and if the low priority queue is not empty, dequeuing a packet from the low priority queue.

11. The media of claim 8, wherein the determining whether the low priority queue has been deemed to be starving comprises determining whether a first time period has elapsed since a dequeue from the low priority queue last occurred.

12. The media of claim 11, wherein the determining whether the low priority queue has been deemed to be starving further comprises, subsequent to determining that the first time period has elapsed, determining whether the low priority queue is empty, wherein if the low priority queue is empty, the low priority queue is no longer deemed to be starving.

13. The media of claim 12, wherein the determining whether the low priority queue is starving further comprises, subsequent to determining that the first time period has elapsed, determining whether a second time period has elapsed since the low priority queue was initially determined to be starving, wherein if the second time period has not elapsed, the low priority queue is deemed to be starving.

14. The method of claim 12, wherein the determining whether the low priority queue is starving further comprises, subsequent to determining that the first time period has elapsed, determining whether a theoretical bandwidth of the high priority queue is less than a predetermined value, wherein if the theoretical bandwidth of the high priority queue is not less than the predetermined value, the low priority queue is deemed to be starving.

15. An apparatus comprising:
a memory element configured to store data; and
a processor operable to execute instructions associated with the data;
wherein the apparatus is configured to:
determine whether a packet received at a network node in a communications network is a high priority packet;
determine whether a low priority queue of the network node has been deemed to be starving;
if the packet is a high priority packet and the low priority queue has not been deemed to be starving, add the packet to a high priority queue, wherein the high priority queue has strict priority over the low priority queue; and
if the packet is a high priority packet and the low priority queue has been deemed to be starving, add the packet to the low priority queue.

16. The apparatus of claim 15, wherein the apparatus is further configured to:
determine whether the high priority queue is empty;
if the high priority queue is not empty, dequeue a packet from the high priority queue;
if the high priority queue is empty, determine whether the low priority queue is empty; and
if the low priority queue is not empty, dequeue a packet from the low priority queue.

17. The apparatus of claim 15, wherein the determining whether the low priority queue has been deemed to be starving comprises determining whether a first time period has elapsed since a dequeue from the low priority queue last occurred.

18. The apparatus of claim 17, wherein the determining whether the low priority queue has been deemed to be starving further comprises, subsequent to determining that the first time period has elapsed, determining whether the low priority queue is empty, wherein if the low priority queue is empty, the low priority queue is no longer deemed to be starving.

19. The apparatus of claim 18, wherein the determining whether the low priority queue is starving further comprises, subsequent to determining that the first time period has elapsed, determining whether a second time period has elapsed since the low priority queue was initially determined to be starving, wherein if the second time period has not elapsed, the low priority queue is deemed to be starving.

20. The apparatus of claim 18, wherein the determining whether the low priority queue is starving further comprises, subsequent to determining that the first time period has elapsed, determining whether a theoretical bandwidth of the high priority queue is less than a predetermined value, wherein if the theoretical bandwidth of the high priority queue is not less than the predetermined value, the low priority queue is deemed to be starving.

\* \* \* \* \*